United States Patent [19]

Weigert

[11] 4,353,642
[45] Oct. 12, 1982

[54] MICROFILM RETRIEVAL SYSTEM

[76] Inventor: Hans Weigert, 284 Franklin Turnpike, Ridgewood, N.J. 07450

[21] Appl. No.: 143,162

[22] Filed: Apr. 23, 1980

[51] Int. Cl.³ .............................................. G03B 21/00
[52] U.S. Cl. ...................................... 355/45; 353/25; 414/263
[58] Field of Search ............... 414/263, 264, 279, 331; 355/40, 43; 353/27 A, 26 A, 25, 107, 117

[56] References Cited

U.S. PATENT DOCUMENTS

| 3,732,546 | 5/1973 | Ronkin et al. | 353/26 A |
|---|---|---|---|
| 3,800,942 | 4/1974 | Hirata et al. | 353/25 |
| 3,868,476 | 2/1975 | Laplume | 353/27 A |
| 3,885,866 | 5/1975 | Stearns | 353/26 A |
| 4,025,176 | 5/1977 | Lopata | 353/26 A |

Primary Examiner—John W. Shepperd
Attorney, Agent, or Firm—Weingram & Klauber

[57] ABSTRACT

A microfilm cartridge storage, retrieval, and projection system is disclosed. The system includes a vertically-oriented cylindrical cartridge storage drum which has a plurality of overlying tiers, each tier including successive side-by-side compartments which are oriented along radials of the cylinder and are adapted to hold a microfilm cartridge. Cartridge receiving and projection head means are mounted proximate the compartments of the drum, and are adapted for receiving a cartridge from a compartment in operative opposition thereto and for optically projecting a selected film frame of the cartridge. Cartridge displacement means mounted proximate the compartments of the drum, are adapted for displacing a cartridge in operative opposition thereto, which is then engaged by the receiving and projection head means. Orienting means are provided to enable relative vertical displacement between the drum, and each of the cartridge receiving and projection head means and the cartridge displacement means. The orienting means also provide angular displacement of the drum about its axis relative to each of the foregoing means to thereby bring each such means in operative opposition to a compartment containing a selected cartridge. Control means responsive to computer or operator selection of a cartridge and film frame actuate the orienting means, and thereupon the cartridge displacement means and the cartridge receiving and projection means.

12 Claims, 11 Drawing Figures

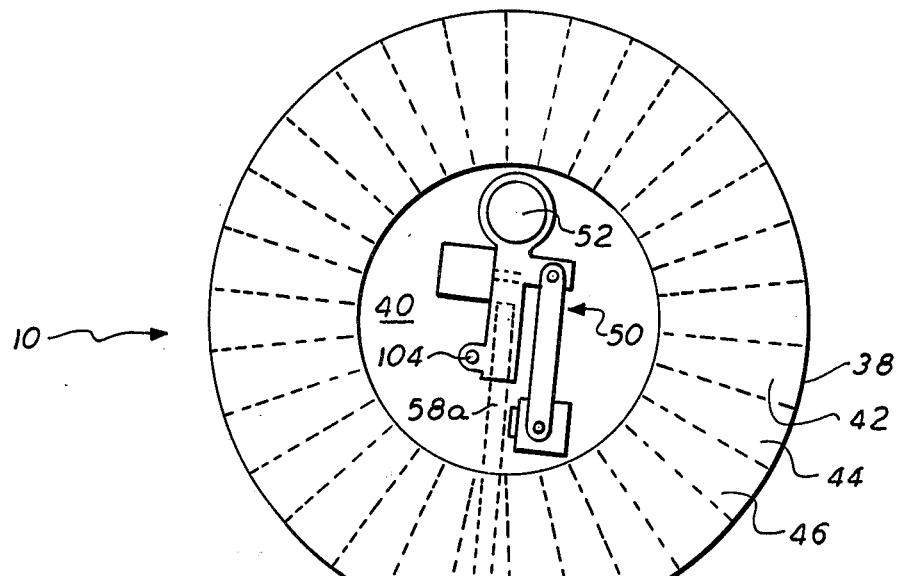
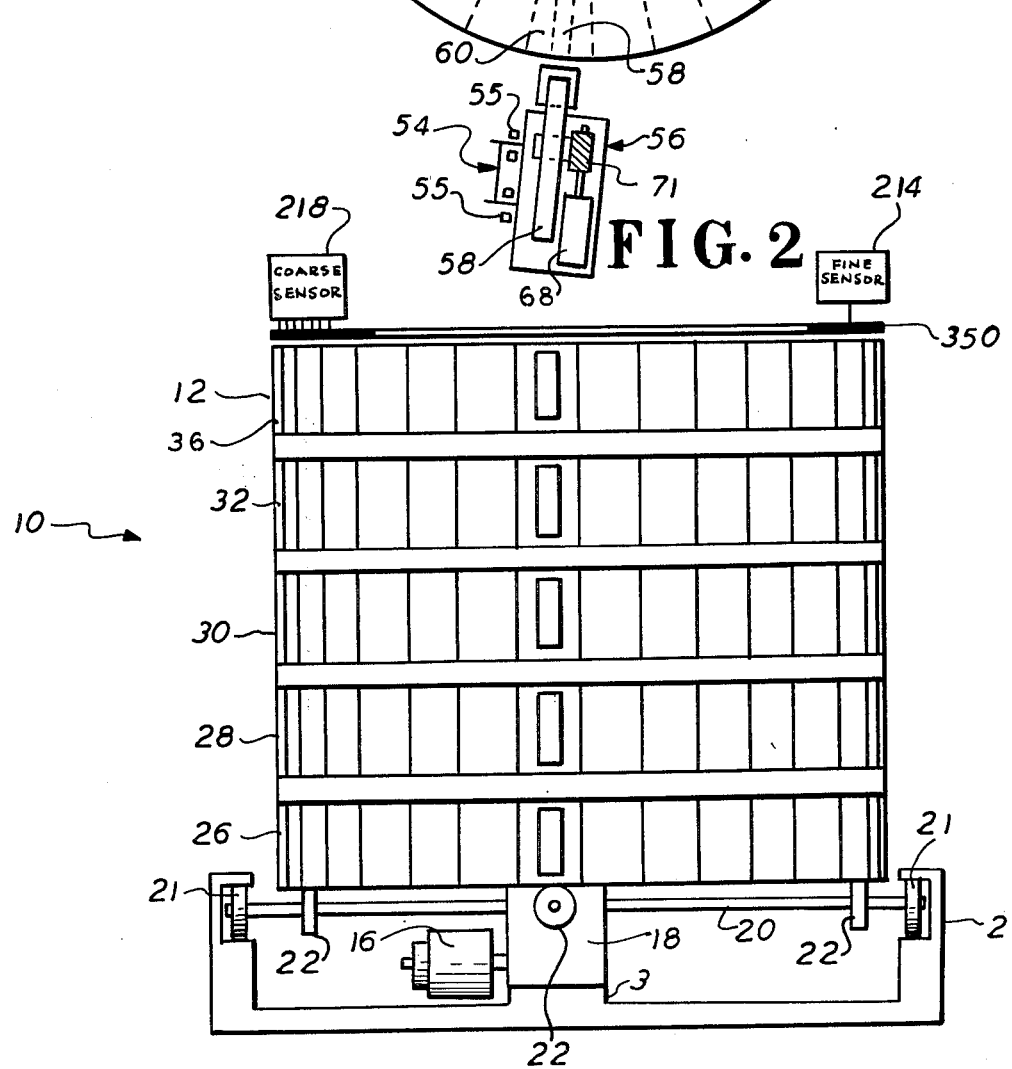

FINE VERTICAL SENSOR 300

COARSE-FINE COMBINING CIRCUIT

IMAGE OF MACHINE READABLE CODE IN RELATIONSHIP TO CODE SENSOR ARRAY

MICROFILM RETRIEVAL SYSTEM

BACKGROUND OF INVENTION

This invention relates generally to random access storage and retrieval apparatus and more specifically relates to a system for storage of a plurality of microfilm cartridges, and for retrieval and projection of selected cartridges and film frames thereof.

Enormous volumes of information are currently stored on microfilm, which most commonly is in reel form and maintained upon distinct unit packages, or so-called "cartridges". While this mode of information storage has resulted in an enormous diminution in volume of shelf space devoted to previous collection of corresponding hard copy, i.e., the original documents, it has been found in practice that retrieval of information from such microfilm records can present most serious difficulties.

By way of a most pointed example: U.S. patent specifications are currently maintained at a plurality of geographic locations, on microfilm cartridges, each cartridge of which may include several hundred or more successive U.S. patents. While this system enables information which prior thereto had occupied hundreds of feet of shelf space to be maintained in relatively small and compact filing cabinets, retrieval of hard copy output equivalent to a specified U.S. patent is a very laborious and time-consuming task, involving multiple operations, which are required to be physically performed by a party interested in obtaining the mentioned material.

Thus, the individual cartridge must first be located by the seeker of a given patent; the cartridge must then be removed from its storage place, laboriously installed at a spaced microfilm viewer, the film threaded with some difficulty, and with great care the frames of interest on the film located. After viewing the material, or producing hard copy output if desired of the selected frames, the cartridge must be rewound by manual direction, thereupon manually removed from the viewing or reproduction machine, and manually replaced n its proper position in the storage cabinet.

It will be clear from the foregoing that where a variety of successive documents are of interest, the steps involved become extremely difficult; and indeed, the advantages gained in reduction of storage space are often offset by the gross inconvenience involved in obtaining hard copy output, or in viewing microfilm frames of interest.

From time to time efforts have been made to automate the foregoing operations. In U.S. Pat. No. 3,456,817 to C. A. Irazoqui, for example, a random access storage and retrieval system is disclosed, which has possible application to storage and retrieval of microfilm cartridges. By and large, however, the system disclosed in this patent, as well as in other publications and the like, have proved to be complex in design, costly and relatively lacking in ease of operation and dependability. Accordingly, a need has long existed and continues to exist for a dependable and efficient system, capable not only of randomly retrieving selected microfilm cartridges and selected microfilm cartridges and selected frames thereof, but also of readily projecting the selected output to provide a visual display of same, or hard copy output equivalent.

In accordance with the foregoing, it may be regarded as an object of the present invention, to provide a microfilm cartridge storage and retrieval system, which is capable of storing in compact fashion large numbers of microfilm cartridges, and of rapidly retrieving a random selected such cartridge, and further thereupon projecting selected frames of the said retrieved cartridge for viewing or for reproduction of hard copy or the like.

It is a further object of the present invention, to provide apparatus of the above character, which is of compact and efficient design, which may therefore be produced at relatively low cost, and which by virtue of its simplicity is of high dependability in operation.

SUMMARY OF INVENTION

Now in accordance with the present invention, the foregoing objects, and others as will become apparent in the course of the ensuing specification, are achieved in a microfilm cartridge storage, retrieval, and projection system, which includes a vertically-oriented cylindrical cartridge storage drum having a plurality of overlying tiers, each tier including successive side-by-side compartments, which are oriented along radials of the cylinder and are adapted to individually hold a microfilm cartridge.

Cartridge receiving and projection head means are mounted proximate the compartments of the drum, and are adapted for receiving a cartridge from a compartment in operative opposition thereto, as well as for optically projecting a selected frame of the cartridge.

Cartridge displacement means are also mounted proximate the compartments of the drum, and are adapted for displacing a cartridge in operative opposition thereto, which cartridge is then engaged by the aforementioned receiving and projection head means.

Orienting means are provided to enable relative vertical displacement between the drum, and each of the cartridge receiving and projection means and the cartridge displacement means. The orienting means also provide angular displacement of the drum about its axis relative to each of the foregoing means, to thereby bring each said means in operative opposition to a compartment containing an operator-selected cartridge. Control means, responsive to computer or operator selection of a cartridge and film frame, actuate the orienting means, and thereupon the cartridge displacement means and the cartridge receiving and projection means.

The cartridge storage drum, preferably includes an open, vertically oriented axial passageway, and at least one of the cartridge receiving and projection head means or the cartridge displacement means, are mounted for vertical displacement along said axial passageway. The other of the two mentioned means are mounted for corresponding and parallel vertical displacement outside the periphery of the drum. In a preferred embodiment of the system, the cartridge receiving and projection head means may be thus mounted for displacement along an axis which extends along the central passageway of the drum.

The aforementioned orienting means includes means for rotating the drum about its axis to achieve the desired angular orientation thereof. To enable such rotation the said drum may be mounted on rollers, and suitable motor means utilized to actuate drum rotation.

The receiving and projection head means includes means for engaging and advancing the cartridge film to a previously selected frame, and means for disposing the selected frame in the optical path of a projection system.

Magnet means may be associated with the cartridge displacement means, for engaging a magnetically responsive portion of the cartridge. Upon this engagement being effected, means may be provided for pushing the cartridge into operative association with the receiving and projection means.

A fixed imaging surface may be mounted adjacent to the storage drum, typically overlying the drum. This surface is in the option projection path proceeding from the receiving and projection head means. Optical path compensator means are mounted in the optical path between the projection head means and the imaging surface, and act to maintain the total optical path constant between the projection head and the imaging surface irrespective of the displaced vertical position of the projection head. The imaging surface may be a viewing screen; or can form part of a hard copy output device, based on photographic imaging, or upon xerographic imaging or so forth.

Auxiliary imaging means are mounted on the projection head to image a blip associated with each film frame onto a pair of sensors and also to image a frame identification code associated with each film frame onto a suitable sensor. The pair of sensors are used to count the film frames and the identification code sensor is used to verify that the correct frame is actually ready for display.

It should be appreciated that as used herein, the terms "cartridge" and "cartridge assembly" are in general interchangeable; except that in the description of FIG. 3, the term "cartridge" is used to generically describe the device commercially available under this term.

BRIEF DESCRIPTION OF DRAWINGS

The invention is diagrammatically illustrated, by way of example, in the drawings appended hereto, in which:

FIG. 1 is a top plan view of a microfilm cartridge storage, retrieval and projection system in accordance with the present invention; portions of the optical projection system residing above the cartridge storage drum have been omitted, for purposes of simplicity;

FIG. 2 is an elevational plan view of the apparatus portions depicted in FIG. 1;

DESCRIPTION OF PREFERRED EMBODIMENT

Figure 3:
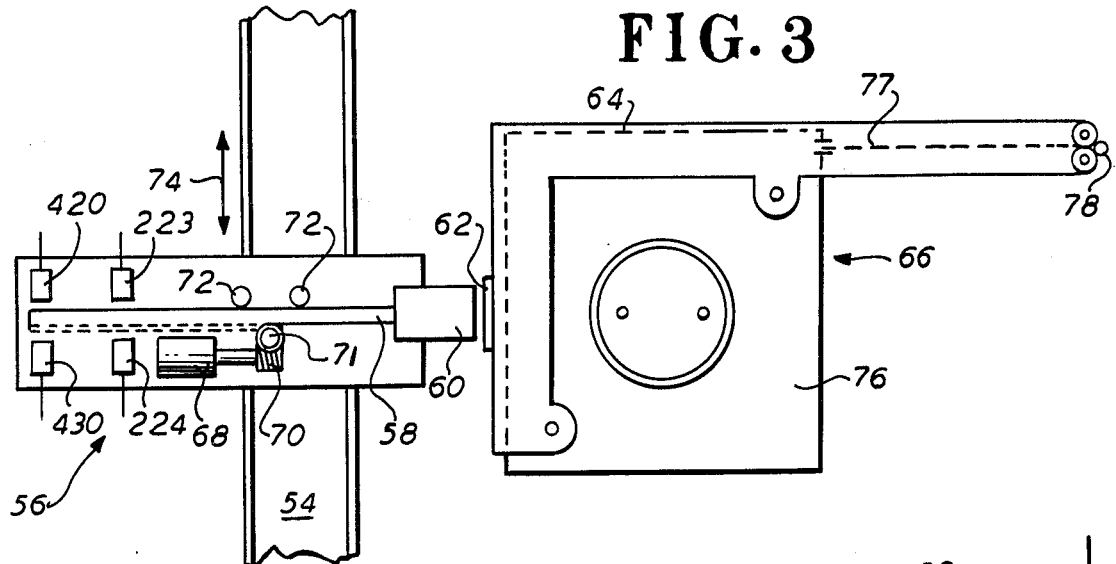
FIG. 3 is a fragmentary elevational view, depicting the cartridge displacement means in association with a representative microfilm cartridge assembly.

In FIGS. 1 and 2 herein, top plan and side elevational views respectively appear of a microfilm storage retrieval and projection system 10 in accordance with the present invention. In the views of FIGS. 1 and 2 certain simplifications have been made for the purpose of clarity, i.e., these views are somewhat schematic in nature. Thus, the elements of the optical projection system which resides above the drum, and will be further discussed in connection with FIG. 6, have not been shown in FIGS. 1 and 2, in order that the remaining elements of the system may be more apparent.

It is thus seen that system 10 includes a storage drum 12, which is mounted for rotation about a central axis on a base 2, which base includes a motor means 16 which operating through a gear box 18 and drive shaft 20 actuates three or more friction drive wheels 22, which engage a ring-like portion at the bottom of drum 12. Operation of motor means 16 thus enables drum 12 to be rotated about its axis to any desired angular position. The whole drum and drive mechanism is supported via bearings 21 and a pedestal 3 on machine base 2.

Drum 12 contains a plurality of overlying successive tiers, such as the tiers 26, 28, 30, 32, and 36. Each such tier includes a plurality of successive side-by-side cartridge holding compartments which as seen in FIG. 1 extend from the periphery 38 of drum 12 to a central opening 40 defined about the drum axis. Thus, each of the said individual compartments, such as compartments 42, 44, 46, etc., extend along radials to the axis of said drum. In the present arrangement, five layers of thirty compartments each are thus apparent in drum 12; but the total number of compartments per tier and of tiers, and thus of cartridge compartments can be selected in accordance with the requirements of a specific arrangement.

The central axial opening 40 of drum 12 contains a cartridge receiving and projection head, indicated generally as 50. This device is mounted for vertical displacement along a support column 52. Details of projection head means 50 will be further discussed in connection with subsequent Figures. External to drum 12, i.e., beyond the periphery 38 of same, there is mounted for vertical displacement upon a column 54, a cartridge displacement means 56 supported on column 54 by bearings 55. Displacements means 56 and the cartridge receiving and projection head means 50, are normally aligned with each other along a radial to the drum, so that actuation of means 56 may displace a cartridge, such as a cartridge at position 58, from its normally stored position in compartment 60, to a position 58a where it is engaged by receiving and projection head means 50 to enable frame selection and projection. Normally further therefore the means 50 and 56 each of which as mentioned are vertically displaceable, are displaced in parallel to corresponding vertical positions with respect to the drum axis.

In FIG. 3, a fragmentary elevational view appears illustrating the operation of cartridge displacement means 56. As already indicated, means 56 is mounted for vertical displacement on a column 54, by means which will be subsequently discussed. Means 56 preferably includes a rack 58, the forward end of which carries an electromagnet 60, which when magnetized engages a magnetically responsive portion 62 secured to an adapter 64 forming part of a cartridge assembly 66. Rack 58 is driven forward and backward by means of a motor 68 through worm gear 70 and pinion 71. The plane of the rack is controlled by passive rollers 72.

In use of the present system, it will be evident that means 56 is displaced vertically in the upward or downward direction 74, i.e., until means 56 is aligned with a desired tier forming part of the drum 12. The motor 16 is actuated to rotate drum 12 to a desired angular position to bring a selected cartridge holding compartment 42, etc. into line with means 56 whereupon motor 68 and electromagnet 60 is actuated. The rack 58 then moves to the right in the sense of FIG. 3, the displace the aligned cartridge 66 to its position in the then-opposed compartment, the displacement acting to bring the cartridge into engagement with the cartridge receiving and projection head means 50.

It will, of course, be evident that following use of the cartridge assembly 66 for projection of a desired film frame, and following rewinding (as will be subsequently discussed), the cartridge is returned to its storage compartment. Cartridge assembly 66 comprises a conventional cartridge 76, with the addition of an adapter 64 which includes the aforementioned magnetically responsive piece 62. The film path within the cartridge 76 terminates the film 77 in a pin 78, which is held in a detented arrangement to adapter 64. This detenting may be magnetic or purely mechanical, as is known in the art.

Figure 4:
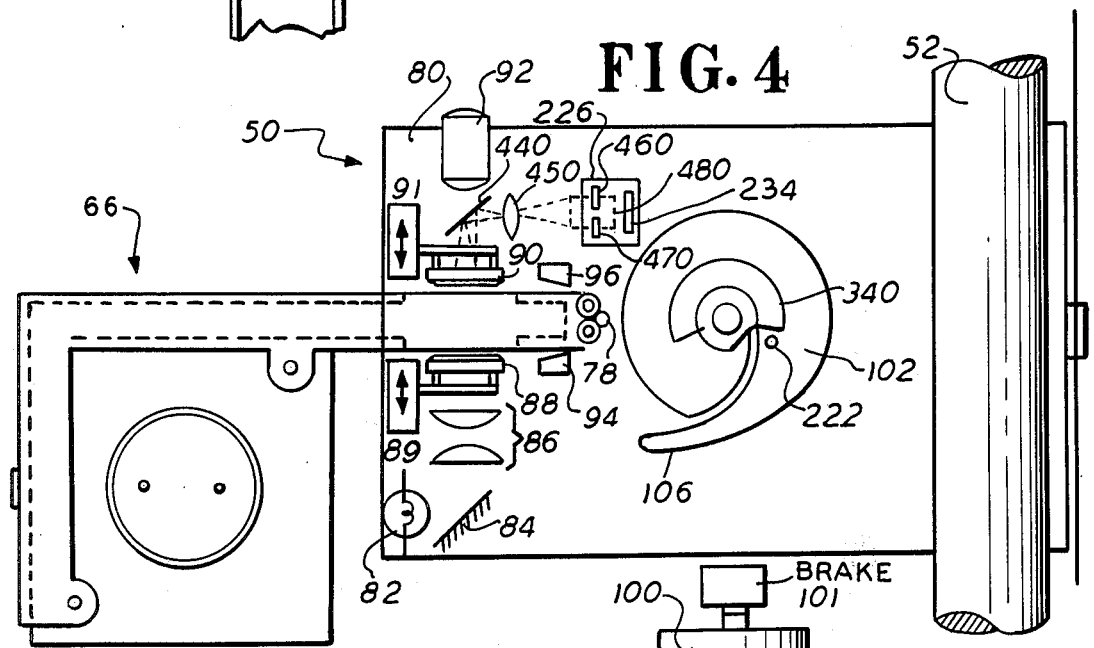
FIG. 4 is a further fragmentary elevational view, depicting a cartridge similar to that of FIG. 3 in operative association with the cartridge receiving means portion of the present system.
Figure 5:
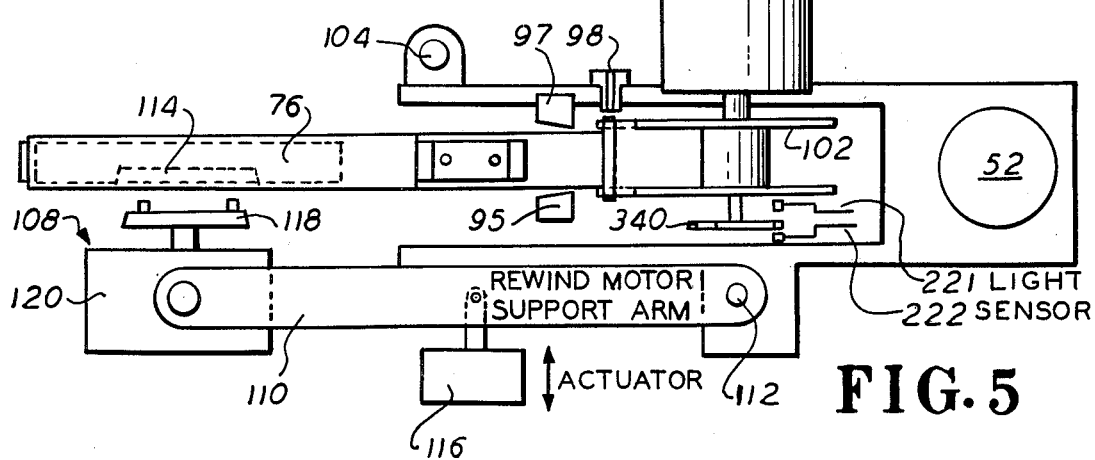
FIG. 5 is a top plan view of the elements of the system depicted in FIG. 4.

Referring now to the partial elevation and plan views of FIGS. 4 and 5, the essential component elements of the cartridge receiving and projection head means 50 appear.

As already indicated means 50, which can be carried on a frame member 80, is mounted upon a column 52 for vertical displacement in either an upward or downward direction. Means 50 includes a projection light source 82, a mirror 84 which is preferably dichroic, a condenser lens system 86, two moveable halves 88 and 90, movable by solenoids 89 and 91, collectively forming a film gate, and an objective lens 92. Tapered guides 94, 95, 96, and 97 are provided, to aid in positioning cartridge assembly 66, upon the latter being displaced for engagement with means 50. A sensor 98, which may be magnetic or of other known type, senses the presence of pin 78 which, as will be later discussed, enables actuation of takeup reel motor 100 connected to the takeup reel 102. A guide column 104 maintains accurate alignment of the entire mechanism thus far discussed.

Additionally, a partially reflecting mirror 440 and an auxiliary projection lens 450 images a blip 480 associated with each film frame and a frame identification code onto sensors 460 and 470 for the blip; and onto sensor 234 for the film identification code. This sensor consists of a multi-element linear array.

In operation, once the cartridge displacement means 56 and cartridge receiving and projection head means 50 are brought into alignment with the selected cartridge, the latter is moved into engagement with means 50. The tapered guides 94, 95, 96 and 97 ensure accurate positioning of the front of frame 64 so that pin 78 may be picked up by the extended fingers 106 of takeup reel 102. The takeup reel 102 flanges contain a slot which engage the projecting ends of pin 78 and guide such pin to the hub of the reel. Before the takeup reel 102 is moved, the rewind motor assembly 108, which is mounted on support arm 110, in turn rotatable about an axis 112, is brought into engagement with the recessed hub 114 of cartridge 76. A simple electromechanical actuator 116 enables the rotational movement of arm 110 to enable receipt of head 118 within hub 114. Rewind motor 120 may be subsequently activated to enable rewinding of the microfilm upon completion of the projection process. Because of the varying and high inertia of the film pulling mechanism, a brake 101 may be fitted to the shaft of the takeup reel motor 100, or rewind motor 120, or to both.

Figure 6:
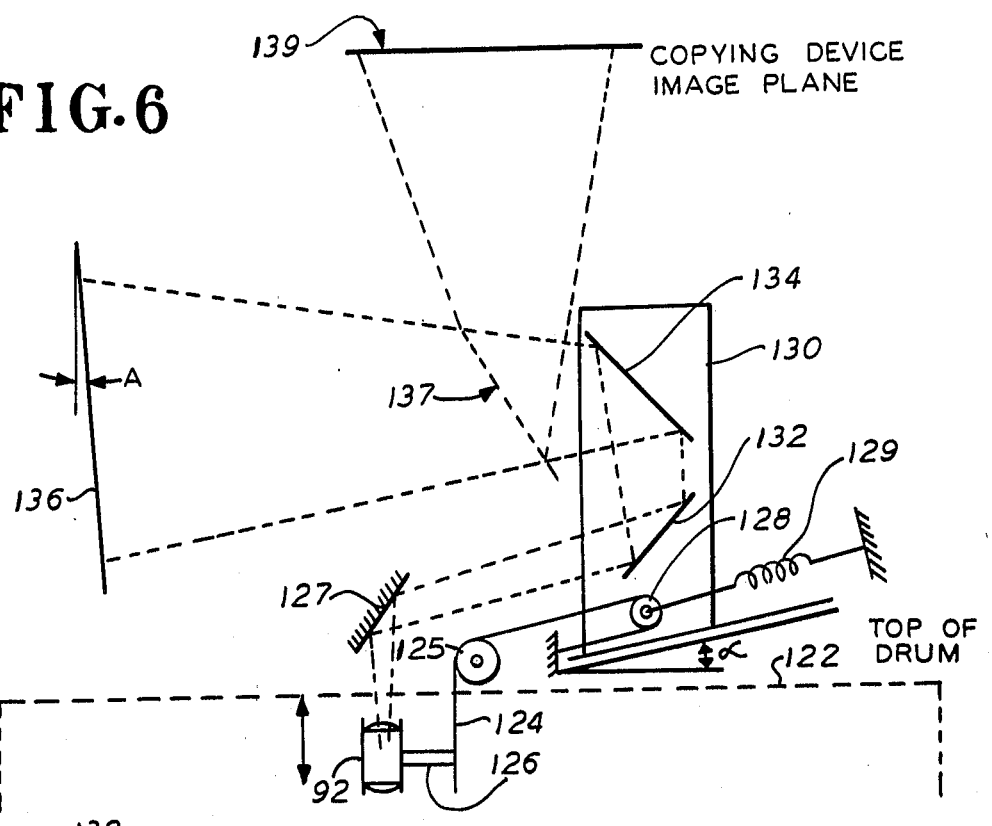
FIG. 6 is a schematic elevational view of the top portion of the cartridge storage drum, the view depicting the projection lens portion of the moveable projection head in association with the remaining components of the optical system which lie above the said drum.

In FIG. 6, a schematic elevational view depicts the remainder of the optical system elements which enable projection of a selected microfilm frame. At the bottom of this Figure, the top edge 122 of drum 12 appear. The projection lens 92 previously referred to is also shown. Lens 92 is coupled in its vertical movement to a belt 124 through a rigid coupling 126. Belt 124 transverses pulleys 129 and 128. Pulley 128 is attached to a mirror support frame 130, which carries two mirrors, 132 and 134. Belt 124 is held taut by spring 129. When lens 96 moves up and down to one tier of the cartridge, it will be clear that mirrors 132 and 134 will be moved half the distance that lens 92 moves. The light path from mirror 127 to mirror 132 will increase or decrease by the amount of movement of the mirrors 132 and 134, as will the light path from mirror 134 to imaging surface 136, which can be a viewing screen. The total light path change from mirror 127 to imaging surface 136 is thus twice the movement of the mirrors 132 and 134, and since the mirrors 132 and 134 move half the distance of lens 92, the total light path remains constant.

The movement of mirror support assembly 116 is shown as being along the optical center from mirror 127 to mirror 132 and this can be selected to be any arbitrary angle A, depending upon the design of the system 10.

An additional mirror 137 can also be inserted in the optical light path to divert the image to the imaging plane 139 of a hard copy device, as e.g. a photosensitive recording media.

Figure 7:
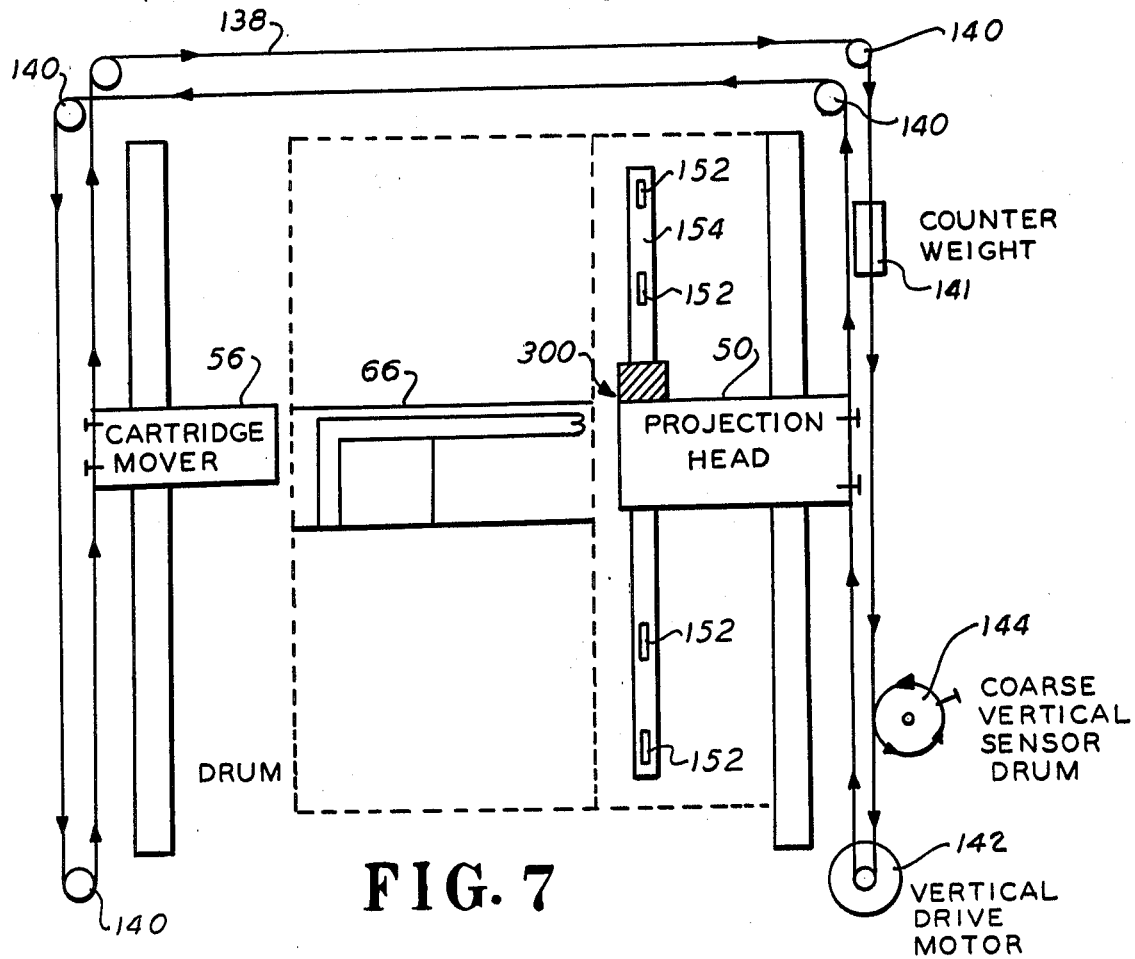
FIG. 7 is a side elevational view of the cartridge storage drum, the cartridge displacement means, and the cartridge receiving and projection head means, the view depicting in highly schematic fashion a representative arrangement for vertical displacement of the last two-mentioned elements.

FIG. 7 schematically illustrates the manner in which the cartridge displacement means 56 and the cartridge receiving and projection head means 50 may be moved to their desired vertical position. As shown in this Figure, means 56 and 50 are coupled by a cable and pulley system, i.e. based upon the continuous cable 138, which passes about a series of pulleys 140. The cable 138, in turn, is actuated by a vertical drive motor 142. A counterweight 141 is inclined to balance the system. Incorporated into this drive system is a sensor drum 144. Cable 138 passes around the drum and is attached thereto at one point. The drum is arranged in such manner that a complete vertical traverse of means 56 and 50, the height of drum 12, will turn sensor drum 144 by less than one revolution. A potentiometer 158 (FIG. 9) is coupled to sensor drum 144 to indicate the rotational position of same, and the output of this potentiometer is thus a measure of the vertical position of means 50 and/or 56.

Figure 8:
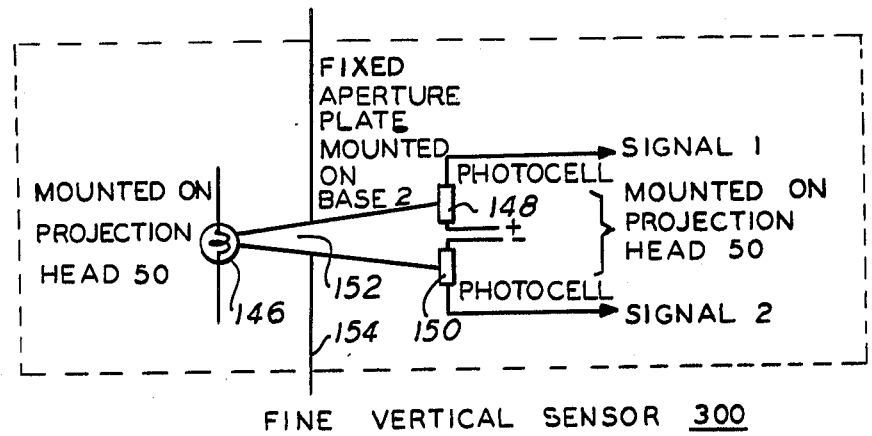
FIG. 8 is a schematic diagram partially illustrating the manner in which vertical positioning of the cartridge displacement means and projected head means can be achieved.

Because of the limitations of the accuracy of the available potentiometers, the potentiometer output is defined as a "coarse" sensor output. An additional sensor is preferably incorporated into the system and referred to as a "fine vertical sensor". As seen in the schematic depiction of FIG. 8, this consists of a light source 146, which is mounted on the cartridge receiving and projection head means 50, and a pair of photocells 148 and 150. The light from source 146 is permitted to illuminate photocells 148 and 150 through a precisely defined aperture in an aperture plate 154, which is fixedly mounted on base 2 (see FIG. 7). When photocells 148 and 150 are equally illuminated, and the output of potentiometer 156 is approximately correct, the projection head means 50 is at the required point in its vertical travel. One such aperture 152 is provided for each tier level of cartridges in storage drum 12. It has been found in practice that the vertical accuracy attainable by such an arrangement is of the order of 0.001 inches, which is more than adequate for the operation of the present system.

Figure 9:
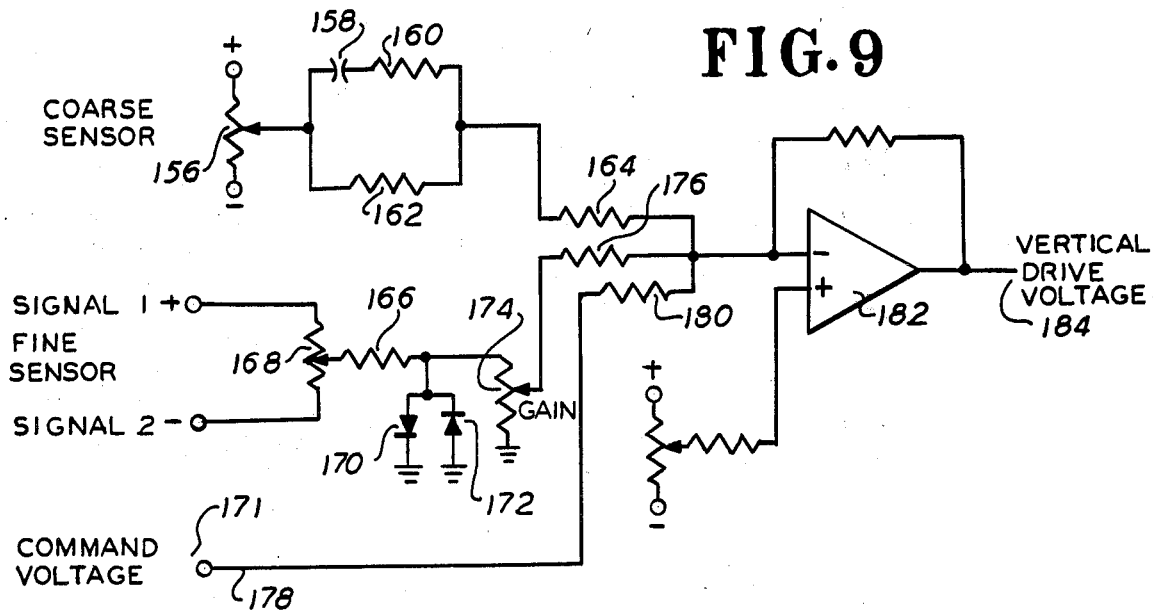
FIG. 9 illustrates a representative coarse-fine combining circuit, which may be utilized in connection with the arrangement of FIGS. 2 and 8.

The output from "coarse" vertical sensor as shown in the electrical schematic diagram of FIG. 9, is developed across potentiometer 156 and fed through a lead network consisting of capacitor 158 and resistors 160 and 162 to a resistor 164. The output of the "fine sensor" photocells 148 and 150 (shown in FIG. 9 as "signal 1" and "signal 2") is fed first to a balancing resistor 168, in which differences between the two photocells are cancelled, and then through resistor 166 to a pair of diodes 170 and 172, which limit the excursion of the signal to a given level, e.g. 0.6 volts, with respect to ground. The limited signal is attenuated through a gain control including resistor 174 and fed to resistor 176. The command voltage 171 in line 178 is of opposite polarity to the signals emanating from the sensors, and is applied to resistor 180. The resistors 164, 176 and 180 represent a summing network, which algebraically adds the output of the sensors with the command voltage signal 171. The difference between zero and the sum signals then represents the error, which is amplified at 182 and utilized at 184 to drive the vertical drive motor 142 until the command and sensor signals exactly cancel each other. The same principles are used to drive the storage drum 12 during its angular rotation, to position same at a desired angle for alignment of a selected cartridge compartment within the selected tier. For the latter purpose, an annular aperture plate 350 (FIG. 1) is exposed to a digital coarse sensor 218, which operates on the same principles as a conventional shaft encoder, and a fine sensor 214 which operates in the same manner as the fine vertical sensor 300.

Figure 10:
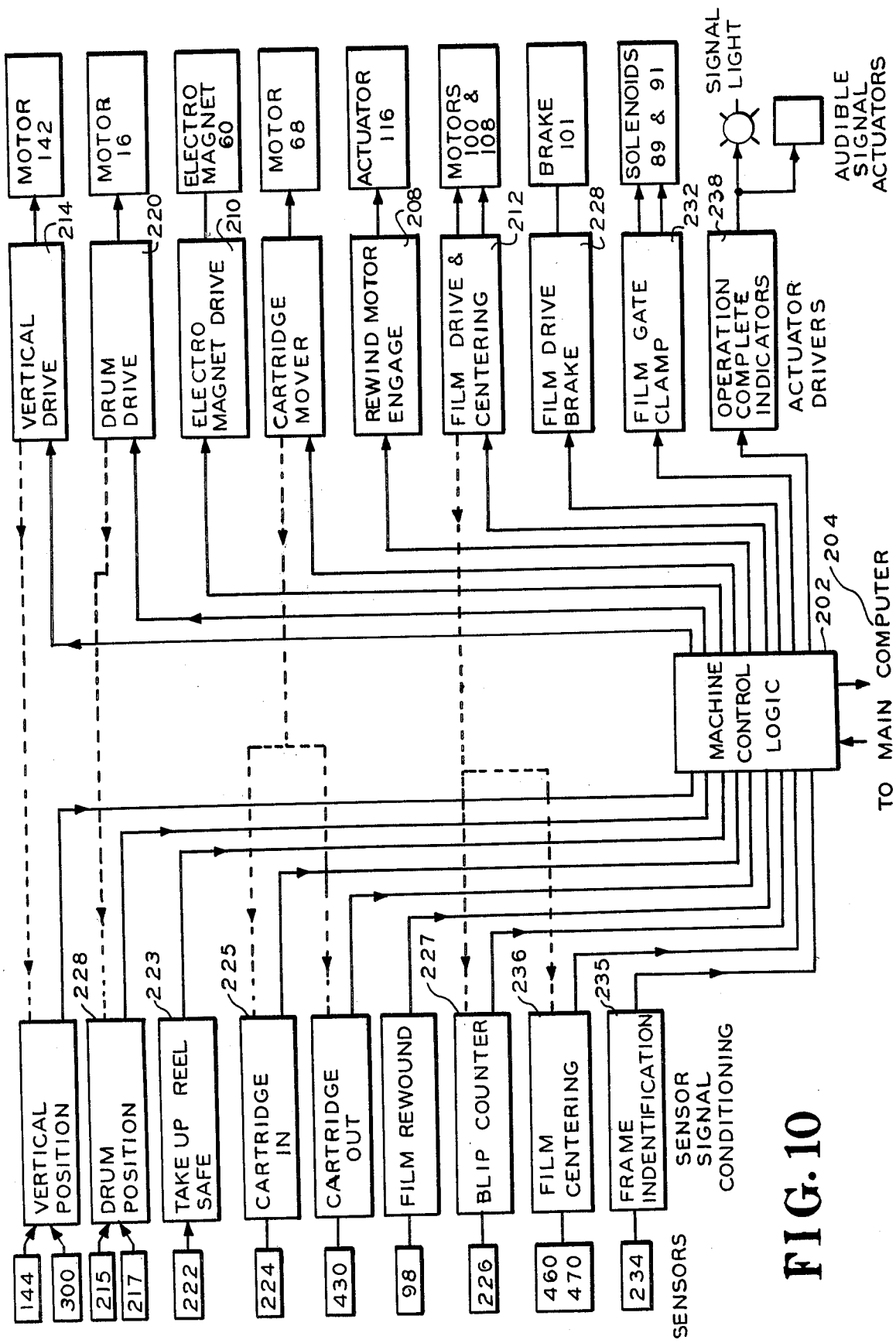
FIG. 10 is a schematic electrical block diagram, illustrating the overall control mechanisms involved in operation of the present system.

In FIG. 10 herein, a schematic system block control diagram appears. This shows the relationship between the various sensors which appear at the left side of the Figure, the system control logic 202, and the various actuators, which appear at the right side of the Figure. The solid lines represent electrical input and control signals; the dotted lines show mechanical or optical coupling between the various elements.

In operation of system 10, a command word is typically received from a main computer 204, which may or may not form part of the system 10. This command word consists of three fields: cartridge vertical address; cartridge horizontal address; and frame number within the cartridge of the film.

Once the command word has been received, film that is being viewed is rewound into its cartridge by a control signal provided to motor drive circuit 212. The output of 212 drives motors 100 and 108. The rewind motor is then disengaged from the cartridge 76 by actuator drive 208. Electromagnet 60 is then actuated by electromagnet drive means 210, this also actuates the motor 68 in FIG. 3 to withdraw rack 58 and retract the cartridge to its storage position.

The vertical positions of projection head means 50 and displacement means 56 are then compared in logic 202, with a new commanded position. Should these two positions differ, then vertical drive 214 drives motor 142 until the two positions, actual and commanded, indeed correspond. Simultaneously with this action, the cartridge horizontal address sensed by drum position sensors 218 and 219 is compared with the commanded address and the drum is driven via a signal derived from command and lines 215 and 217 to drum drive 220, until the two command and sensor signals correspond.

Thereupon, the take-up reel 102 position is checked via sensor 222 to ensure that the take-up reel is not in a "forbidden" position. The "forbidden" position is defined as one where, when the cartridge is moved into engagement with the projector head, the pin holding the end of the film might come into contact with the rim of the take-up reel. The "forbidden" position is defined (FIGS. 4 and 5) by a vane 340, attached to the take-up reel 102 and sensed by a light 221 and sensor 222. If the take-up reel is indeed in a "forbidden" position, take-up motor 100 is driven slowly until take-up reel 102 is in a permitted or "safe" position. At that time, electromagnet drive means 210 is actuated and the cartridge is moved into engagement with the projector head means 50. At the completion of that operation, as sensed by "Cartridge-In" sensor 224 (FIG. 3), which is exposed to light source 223, the film is unwound.

Figure 11:
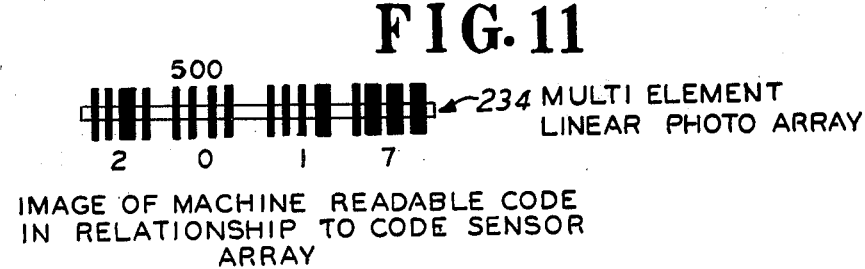
FIG. 11 is a representation of one form of frame identification coding utilizable in the invention.

At the bottom of each image on the film, as is known in the art, is a blip or dark rectangle on a clear background (or the negative thereof). These blips are counted by sensor 226 (FIG. 4), and at a specified number of frames before the desired frame, the film drive is decelerated, and the film is brought to a stop with the correct frame exposed. To aid in this stopping, the take-up reel drive is fitted with a brake 101, actuated by brake drive 228, in turn enabled by a signal from logic 202. Once the film has been brought to a halt, the position of the blip is detected by a pair of photocells 460 and 470 (FIG. 4), which must be equally illuminated when the blip is centered. The film drive will drive the film until the blip is centered. At the time, the film gate drive 232 drives clamp means 89 and 91 and the film is clamped between portions 88 and 90 of the film gate, as discused in connection with FIG. 4, whereupon the film is in a well-defined focal plane. At this time, a further sensor 234 reads a machine-readable code 500 (FIG. 11) which is part of the image, to determine that the frame displayed is indeed the frame desired. If not, control logic 202 will enter the control program at an appropriate point to ensure that the correct frame is displayed. Upon the film being appropriately centered (as determined by sensor 226) and therefore, ready for projection, a signal is provided to operation complete indicator 238, which may consist of an indicator light and/or an audible signal. This confirms that the projection may now safely take place, for viewing, reproduction, or so forth.

While the present invention has been particularly set forth in terms of specific embodiment thereof, it will be understood in view of the present disclosure, that numerous variations upon the invention are now enabled to those skilled in the art, which variations yet reside within the scope of present teaching. Accordingly the invention is to be broadly construed, and limited only by the scope and spirit of the claims now appended hereto.

I claim:

1. A microfilm cartridge storage drum having a given axis and a plurality of tiers, each of which includes successive side-by-side compartments oriented along radials of said cylinder and adapted to hold a microfilm cartridge;
   cartridge receiving means mounted proximate to the said compartments of said drum, and movable axially relative to said drum for receiving a cartridge from one of said compartments in operative opposition thereto, and for optically projecting a selected frame thereof;
   cartridge displacement means mounted proximate the compartments of the drum and movable axially parallel to and in conjunction with said cartridge receiving means for displacing a cartridge in operative opposition thereto to said receiving and projection means;
   orienting means for providing relative displacement between said drum and each of said receiving and projection head means and said cartridge displacement means, and for providing relative angular displacement of said drum about its axis relative to each of said means to thereby bring each of said receiving and projection head means and said cartridge displacement means in operative opposition to one of said compartments containing a selected cartridge; and
   control means responsive to operative selection of a cartridge and frame thereof for actuating said orienting means, and thereupon said cartridge displacement means, and said cartridge receiving and projection head means.

2. A microfilm cartridge storage, retrieval and projection system, comprising in combination:
   a vertically-oriented cylindrical cartridge storage drum having an open, vertically oriented axial passageway and a plurality of overlying tiers, each said tier including successive side-by-side compartments oriented along radials of said cylinder and adapted to hold a microfilm cartridge;
   cartridge receiving and projection head means being mounted proximate the said compartments of said drum, for directly receiving a cartridge from a said compartment in operative opposition thereto, and for optically projecting a selected frame thereof;
   cartridge displacement means mounted proximate the said compartments of said drum for displacing a cartridge in operative opposition thereto, directly to said receiving and projection head means;
   one of said cartridge displacement means and said cartridge receiving means being mounted for displacement along said axial passageway and the other means being mounted for corresponding parallel vertical displacement outside the periphery of said drum;
   orienting means for providing relative vertical displacement between said drum and each of said cartridge receiving and projection head means, and said cartridge displacement means, and for providing relative angular displacement of said drum about its axis relative to each of said means, to thereby bring each of said receiving and projection head means and said cartridge displacement means in operative opposition to a said compartment containing a selected cartridge; and
   control means responsive to operative selection of a cartridge and frame thereof, for actuating said orienting means, and thereupon said cartridge displacement means, and said cartridge receiving and projection head means.

3. A system in accordance with claim 2, wherein said cartridge receiving and projection head means is displaceable along an axis extending along said passageway.

4. Apparatus in accordance with claim 3, wherein said orienting means includes means for rotating said drum to achieve said desired angular orientation thereof.

5. Apparatus in accordance with claim 4, wherein said receiving and projection head means includes means for engaging and advancing the cartridge film to a selected frame; and means for disposing the selected frame in the optical path of a projection system.

6. Apparatus in accordance with claim 5, wherein said cartridge displacement means includes means for engaging a responsive portion of said cartridge, and means for pushing the engage cartridge into operative association with said receiving and projection means.

7. A system in accordance with claim 5, further including a fixed imaging surface mounted adjacent the said drum, and in the optical projection path proceeding from the receiving and projection head means.

8. A system in accordance with claim 7, further including optical path compensator means mounted in the optical path between said projection head means and said imaging surface, for maintaining the total optical path constant between said projection head and said imaging surface irrespective of the displaced vertical position of said projection head.

9. Apparatus in accordance with claim 8, comprising a mirror reflection block including a pair of space mirrors for turning the optical projection path through successive 90° turns, and means for displacing said block parallel to the entering and exiting optical paths to said block, in accordance with the displacement of said optical projection head means.

10. Apparatus in accordance with claim 7, wherein said imaging surface is a viewing screen.

11. Apparatus in accordance with claim 7, wherein said imaging surface forms part of a hard-copy output device.

12. A microfilm cartridge storage, retrieval and projection system in accordance with claim 2, further including means for advancing and stopping the film of said cartridge to position an individual frame for projection, to enable display or production of hard copy equivalent thereof;
   means for reading machine-readable indicia associated with individual frames of said microfilm;
   means for comparing the machine-read indicia of the frame positioned for projection with the indicia appropriate to a specified frame; and
   means responsive to a difference between said indicia readings for further moving the microfilm to bring the said specified frame into display position.

* * * * *